Dec. 15, 1925.
F. H. FORD
HEADLIGHT LENS
Filed Sept. 6, 1921
1,565,433
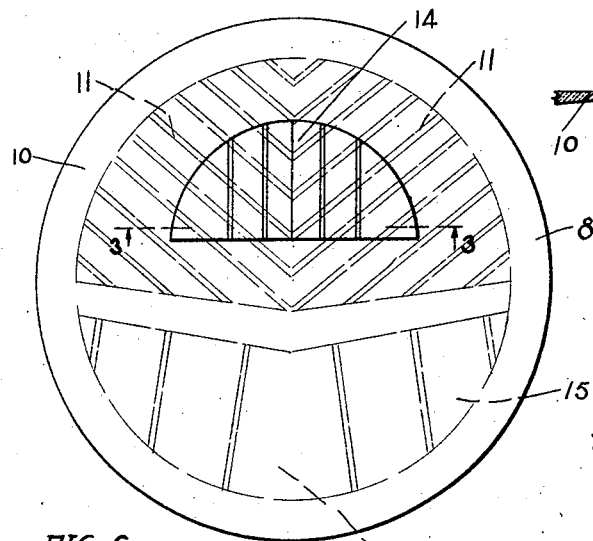
FIG. 1
FIG. 3
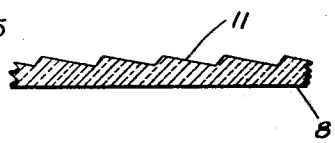
FIG. 4
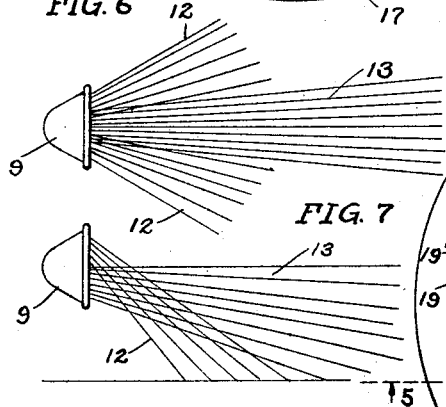
FIG. 6
FIG. 7
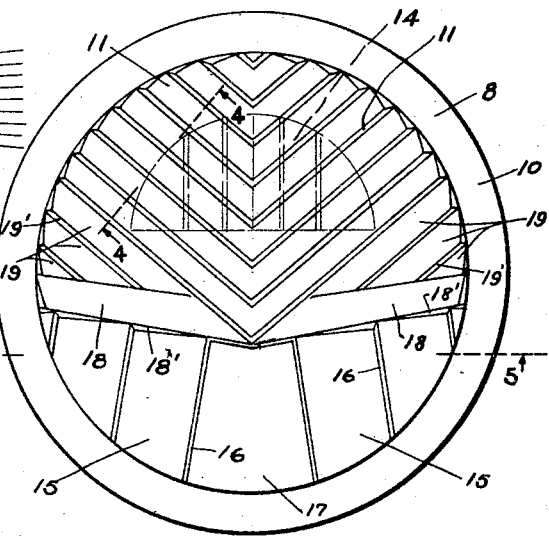
FIG. 2
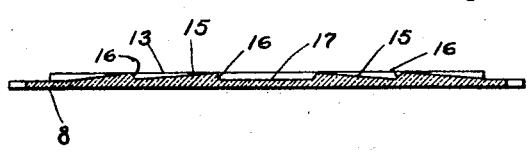
FIG. 5
INVENTOR.
Frederick H. Ford,
BY Morsell + Keeney,
ATTORNEYS.

Patented Dec. 15, 1925.

1,565,433

UNITED STATES PATENT OFFICE.

FREDERICK H. FORD, OF WAUPUN, WISCONSIN, ASSIGNOR TO THE TOTALUX COMPANY, A CORPORATION OF WISCONSIN.

HEADLIGHT LENS.

Application filed September 6, 1921. Serial No. 498,653.

*To all whom it may concern:*

Be it known that I, FREDERICK H. FORD, a citizen of the United States, and resident of Waupun, in the county of Dodge and State of Wisconsin, have invented new and useful Improvements in Headlight Lenses, of which the following is a description, reference being had to the accompanying drawings, which are a part of this specification.

This invention relates to improvements in headlight lenses more particularly adapted for automobiles, street cars, locomotives and other vehicles.

It is one of the objects of the present invention to provide a headlight lens which will illuminate the road a considerable distance ahead of the lamp and confine said illumination to a limited level, and to also direct rays of light of a less degree of strength on opposite sides of the road and at a less distance.

A further object of the invention is to provide a headlight lens which is of simple construction, is strong and durable and is well adapted for the purpose desired.

With the above and other objects in view the invention consists of the improved headlight lens, and its parts and combinations as set forth in the claims and all equivalents thereof.

In the accompanying drawing in which the same reference characters indicate the same parts in all of the views:

Fig. 1 is a front view of the improved headlight lens;

Fig. 2 is a rear view thereof;

Fig. 3 is a sectional detail view thereof taken on a larger scale on line 3—3 of Fig. 1;

Fig. 4 is a sectional detail view taken on a larger scale on line 4—4 of Fig. 2;

Fig. 5 is a horizontal sectional view taken on line 5—5 of Fig. 2;

Fig. 6 is a top view of a lamp showing the manner in which some of the rays of light are deflected laterally; and Fig. 7 is a side view of a lamp showing the manner in which some of the rays of light are deflected downwardly.

When the light source is positioned so that all of the light source is back of the focus of the reflector, the rays of light making up the beam will diverge forming a cone shaped or spreading beam with its apex towards the headlight. The spread of the beam will increase as the light source is moved farther back of the reflector focus. This position of the light source will be referred to hereafter as back of the focus.

It has been found that the following are the essentials of a safe and comfortable driving light:

First: A light which will permit the driver to quickly distinguish the travelled part of the road and objects on it to a distance of at least 200 feet and farther if possible.

Second: The light should have spread to permit the driver to distinguish objects for several feet on either side of the car to a distance of 150 feet ahead.

Third: At the distance ahead of the car at which the driver commonly watches the edge of the road when turning out from the main travelled part of the roadway the light should be so bright as to offset or neutralize the glare from approaching cars. It has been found that if the illumination on the road at this point is not less than one half the apparent candle power of the light thrown in the driver's eyes by approaching headlights the glare from said headlights is largely neutralized. Experiments show that if the light along the edge of the road from 40 to 70 feet ahead of the car is not less than 5000 apparent candle power the desired result is accomplished.

Fourth: The light from the driver's own headlights should be kept below the average eye level of persons approaching his headlights.

To accomplish the above result with the type of headlight in common use the improved lens is constructed as follows:

The lens is adapted to be used with a headlight having its bulb or other source of light set back of the focus or ahead of the focus of the reflector. With this setting of the light source the rays of light in the lower half of the main cone of light will all be projected at a downward angle towards the roadway or parallel to the surface of the roadway. By setting the source of light far enough back or ahead of the focus to give a wide spread to the cone of light, a wide area of illumination of the roadway is secured without any modification of the light other than that caused by the reflector itself.

As with the setting noted above, none of the light from the lower half of the main cone of light will rise above the level of the axis of the cone, it is not necessary to modify the vertical component of this half of the cone of light to eliminate glare.

To secure the brightness of illumination necessary to enable the driver to quickly distinguish objects on the main travelled part of the roadway, the part of the lens through which the light forming the lower half of the main cone of light passes is provided with prisms so arranged as to deflect the light laterally towards a plane passing vertically through the axis of the cone of light thus concentrating this light so far as its horizontal component is concerned.

The improved lens comprises a circular plate of glass or other transparent material 8 which is adapted to be mounted on a headlight 9 of parabolic form. The upper half 10 of the lens, through which the light forming the upper half of the main cone of light passes, is provided on its inner face with two sets of diagonally extending prisms all arranged in such a way as to divide the light in the upper half of the cone into two segments 12 which are deflected downwardly and outwardly as shown in Figs. 6 and 7 to intercept the roadway at either side of the intersection of the light rays 13 in the lower half of the main light cone with the roadway. These segments 12 of the upper half of the light cone are deflected as units and the relative distribution of the light in these segments are produced by the reflector is not changed by this deflection.

To provide for the possibility that the light from the lower half of the main light cone 13 and the light from the two segments of the upper half of the main light cone might not overlap at their intercept with the roadway thereby causing objectionable shadows, short prisms 14 are formed on the outer or front face of the lens. The function of these prisms is to take some of the light which would otherwise be projected toward the extreme outer edges of the illuminated area and deflect this portion of the light and cause it to overlap the portions of the light intersecting the light from the upper and lower halves of the main light cone 13 with the roadway.

Taking up the construction of the lens in detail and first considering a lens for use where the light source is back of the focus, prisms 15 formed on the lower inner side portion of the lens are constructed with their bases 16 toward the vertical diameter of the lens. These prisms are slightly inclined to the vertical to add to the appearance of the lens and their function is to concentrate the rays of light passing through this part of the lens on the center of the road. The section 17 between the prisms 15 is plain and does not affect the rays of light passing therethrough.

Prisms 18 interposed between the prisms 11 and 15 have their bases 18' at their lower portions and deflect a small amount of light on the edges of the road fairly close to the car. These prisms are provided more as a safety factor in case the adjustment of the lamp bulb is not properly made or in case the lamp filament is below the axis of the reflector.

Prisms 19 are similar to the prisms 11 but are of less length. Said prisms 19 have their bases 19' down approximately 40° with the vertical diameter of the lens and approximately 10° with the face of the lens. The same applies to the prisms 11 except that they are at an approximate angle of 15° with the face of the lens. The prisms 11 and 19 occupy slightly more than the upper half portion of the lens and divide the rays of light in said upper portion of the lens into two segments and direct them downward and sideways toward either side of the road as before explained.

For use with a headlight having the light source set ahead of the focus the entire construction would be reversed, that is, the prisms 11 and 19 would be in the lower half of the lens with their bases down. The prisms 15 would be in the upper half of the lens with their bases away from the vertical diameter of the lens and the prisms 18 would be in the upper half of the lens with bases down. The general appearance of the lens would be the same as shown except that it would be turned upside down.

From the foregoing description it will be seen that the headlight lens is of very simple construction and is well adapted for the purpose described.

What I claim as my invention is:

1. A headlight lens having a plain portion and a portion provided with diagonally extending prisms, another portion on opposite sides of the plain portion provided with prisms extending slightly at an angle to vertical lines and another portion provided with approximately horizontally extending prisms, all of said prisms being formed on one side face of the lens member, and vertically extending prisms formed on the opposite side of the lens member.

2. A headlight lens having its upper portion formed with diagonally extending prisms extending upwardly outwardly from a central vertical line, a lower central plain portion provided on opposite sides with prisms extending slightly at an angle to vertical lines and an intermediate portion between the upper and lower portions provided with approximately horizontally extending prisms, all of said prisms being formed on one side face of the lens, and vertically extending prisms formed on the upper portion of the opposite side of the lens.

3. A headlight lens having upper adjacent segmental portions provided with prisms extending diagonally downwardly towards each other for deflecting separate segmental rays of light passing through the lens downwardly and at an angle away from a vertical plane passing through a reflector with which the lens is used, approximately vertically extending prisms formed on the lower portion of the lens for concentrating some of the rays of light passing therethrough towards the said vertical plane, approximately horizontally extending prisms interposed between the diagonal and vertical prisms for deflecting rays of light passing therethrough downwardly, laterally and close to the lens, all of said prisms being on one side of the lens, and a segmental portion of vertically extending prisms formed on the upper portion of the opposite side of the lens for deflecting rays of light downwardly and centrally in front of the lens.

In testimony whereof, I affix my signature.

FREDERICK H. FORD.